(12) United States Patent
Breton et al.

(10) Patent No.: US 7,563,314 B2
(45) Date of Patent: Jul. 21, 2009

(54) INK CARRIERS CONTAINING NANOPARTICLES, PHASE CHANGE INKS INCLUDING SAME AND METHODS FOR MAKING SAME

(75) Inventors: Marcel P. Breton, Mississauga (CA); Adela Goredema, Mississauga (CA); Christine E. Bedford, Burlington (CA); Christopher Wagner, Toronto (CA); Sandra Gardner, Oakville (CA); Nan-Xing Hu, Oakville (CA); Bruce Goodbrand, Hamilton (CA)

(73) Assignee: Xerox Corporation, Norwalk, CT (US)

( * ) Notice: Subject to any disclaimer, the term of this patent is extended or adjusted under 35 U.S.C. 154(b) by 525 days.

(21) Appl. No.: 11/291,540

(22) Filed: Nov. 30, 2005

(65) Prior Publication Data
US 2007/0119340 A1 May 31, 2007

(51) Int. Cl.
*C09D 11/00* (2006.01)
(52) U.S. Cl. .................................................. 106/31.43
(58) Field of Classification Search ................. 528/310; 524/211; 347/95; 523/160
See application file for complete search history.

(56) References Cited

U.S. PATENT DOCUMENTS

| | | | |
|---|---|---|---|
| 3,172,892 A | 3/1965 | LeSuer et al. | |
| 3,202,678 A | 8/1965 | Stuart et al. | |
| 3,219,666 A | 11/1965 | Norman et al. | |
| 3,280,034 A | 10/1966 | Anzenberger et al. | |
| 3,361,673 A | 1/1968 | Stuart et al. | |
| 3,381,022 A | 4/1968 | LeSuer | |
| 3,442,808 A | 5/1969 | Traise et al. | |
| 3,912,764 A | 10/1975 | Palmer et al. | |
| 4,234,435 A | 11/1980 | Meinhardt et al. | |
| 4,889,560 A | 12/1989 | Jaeger et al. | |
| 4,889,761 A | 12/1989 | Titterington et al. | |
| 5,195,430 A | 3/1993 | Rise | |
| 5,221,335 A | 6/1993 | William et al. | |
| 5,231,135 A | 7/1993 | Machell et al. | |
| 5,286,799 A | 2/1994 | Harrison et al. | |
| 5,319,030 A | 6/1994 | Harrison et al. | |
| 5,372,852 A | 12/1994 | Titterington et al. | |
| 5,389,958 A | 2/1995 | Bui et al. | |
| 5,496,879 A | 3/1996 | Griebel et al. | |
| 5,621,022 A | 4/1997 | Jaeger et al. | |
| 5,645,632 A | 7/1997 | Pavlin | |
| 5,783,657 A * | 7/1998 | Pavlin et al. | 528/310 |
| 5,863,319 A | 1/1999 | Baker et al. | |
| 5,985,968 A * | 11/1999 | Lassila et al. | 524/211 |
| 5,998,570 A | 12/1999 | Pavlin et al. | |
| 6,111,055 A | 8/2000 | Berger et al. | |
| 6,174,937 B1 | 1/2001 | Banning et al. | |
| 6,221,137 B1 | 4/2001 | King et al. | |
| 6,471,758 B1 * | 10/2002 | Kelderman et al. | 106/31.29 |
| 6,472,523 B1 | 10/2002 | Banning et al. | |
| 6,476,219 B1 | 11/2002 | Duff et al. | |
| 6,576,747 B1 | 6/2003 | Carlini et al. | |
| 6,576,748 B1 | 6/2003 | Carlini et al. | |
| 6,590,082 B1 | 7/2003 | Banning et al. | |
| 6,858,070 B1 | 2/2005 | Wong et al. | |
| 2002/0149656 A1 * | 10/2002 | Nohr et al. | 347/95 |
| 2003/0040551 A1 * | 2/2003 | Yamaguchi et al. | 523/113 |
| 2004/0102540 A1 * | 5/2004 | Jaeger et al. | 523/160 |

FOREIGN PATENT DOCUMENTS

| | | |
|---|---|---|
| DE | 4205713AL | 2/1992 |
| DE | 4205636AL | 8/1993 |
| EP | 0 776 963 | 6/1997 |
| WO | WO98/17705 | 4/1998 |

OTHER PUBLICATIONS

U.S. Appl. No. 11/004,332.
U.S. Appl. No. 11/004,333.

* cited by examiner

*Primary Examiner*—Melvin C Mayes
*Assistant Examiner*—Stefanie Cohen
(74) *Attorney, Agent, or Firm*—Marger Johnson & McCollom, PC

(57) ABSTRACT

Disclosed is an ink carrier and a method for forming same, and a phase change ink including same. The ink carrier comprises a colloidal dispersion of at least one of silica nanoparticles and metal oxide nanoparticles. The ink carrier can also include a low melting wax, and a gelling agent. The ink carrier exhibits a substantially uniform distribution of the nanoparticles so that they are discretely distributed therewithin, and are substantially resistant to the aggregation of the nanoparticles distributed therewithin.

28 Claims, No Drawings

INK CARRIERS CONTAINING NANOPARTICLES, PHASE CHANGE INKS INCLUDING SAME AND METHODS FOR MAKING SAME

BACKGROUND

Disclosed herein are ink carriers, phase change inks and methods for making same. More specifically, disclosed herein are ink carriers and phase change inks including at least one of silica nanoparticles and metal oxide nanoparticles which can be used in direct and indirect printing processes. In one embodiment, the phase change inks are of the low energy type. The ink carriers (1) can comprise (A) a colloidal dispersion of at least one of silica nanoparticles and metal oxide nanoparticles, the ink carrier exhibiting a substantially uniform distribution of said nanoparticles therewithin, with a substantially reduced aggregation of the nanoparticles distributed therewith. The ink carrier can also include at least one of (B) a low melting wax, and (C) a gelling agent. The gelling agent can be (a) a urea material or (b) an ester-terminated amide. An embodiment of this disclosure is directed to a phase change ink which comprises the above-described ink carrier (1) and (2) a colorant.

Another embodiment is directed to a method which comprises (a) incorporating into an ink jet printing apparatus the above-described phase change ink composition (b) melting the ink; (c) causing droplets of the melted ink to be ejected in an imagewise pattern onto an intermediate transfer member; and (d) transferring the ink in the imagewise pattern from the intermediate transfer member to a final recording substrate.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (commercially available from C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labeling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known and are described in U.S. patent application Ser. No. 10/881,047, the disclosure of which is totally incorporated herein by reference.

U.S. Pat. No. 5,783,657, U.S. Pat. No. 5,998,570 and WO 98/17704, (Pavlin et al), the disclosures of each of which are totally incorporated herein by reference, disclose a low molecular weight, ester-terminated polyamide that may be blended with a liquid hydrocarbon to form a transparent composition having gel consistency. The ester-terminated polyamide is prepared by reacting "x" equivalents of dicarboxylic acid wherein at least 50% of those equivalents are from polymerized fatty acid, "y" equivalents of diamine such as ethylene diamine, and "z" equivalents of monoalcohol having at least 4 carbon atoms. The stoichiometry of the reaction mixture is such that $0.9 \leq \{x/(y+z)\} \leq 1.1$ and $0.1 \leq \{z/(y+z)\} \leq 0.7$. The reactants are heated until they reach reaction equilibrium.

U.S. Pat. No. 6,111,055 (Berger, et al), the disclosure of which is totally incorporated herein by reference, discloses an ester terminated dimer acid-based polyamide which is blended with a solvent to form a gel. The solvent may be flammable, and a wick may be added to the resulting gel to form a candle. The said ester terminated dimeracid-based polyamide is prepared by thermal condensation of a diacid, a diamine and a monoalcohol.

A need remains for improved phase change inks, and more specifically, low energy solid inks which permit phase change ink jet printers to perform at more moderate operating conditions than with conventional phase change inks. For example, a need exists for phase change inks which can be jetted at temperatures lower than conventional jetting temperatures as described below. Also, there is a need for phase change inks having improved transfuse latitude and low stand-by energy. In addition, a need remains for phase change inks which exhibit robustness, that is resistance to scratch, crease and abrasion with substantially no smear. There is also a need for phase change inks that can exhibit at least some of the above advantages with reduced energy requirements while printing. Additionally, a need remains for phase change inks that print successfully on paper and transparency stock. Furthermore, there is a need for phase change inks that generate prints with good performance in automatic document feeders.

SUMMARY

Many phase change inks currently being used in solid ink jet piezoelectric printers employ high jetting temperatures (about 140 degrees C.) and long warm up times. The images currently produced by these inks can also, in many instances, exhibit poor scratch resistance and image permanence.

Disclosed herein is an ink carrier which is used in forming a phase change ink composition, the ink carrier comprising (A) a colloidal dispersion of at least one of silica nanoparticles and metal oxide nanoparticles. The ink carrier can also include at least one of (B) a low melting wax, and (C) a gelling agent.

Also disclosed herein are low energy solid inks comprising the ink carrier described above. The inks exhibit a substantially high degree of nanoparticle uniformity and a substantially reduced degree of nanoparticle aggregation.

A method can also be provided which comprises forming the above-described ink by combining the colloidal dispersion of nanoparticles with other ink carrier components. More particularly, the colloidal dispersion of nanoparticles can be combined with a low melting wax and a gelling agent. Another embodiment of this disclosure is directed to a method which comprises (a) incorporating into an ink jet printing apparatus an ink composition comprising (1) the above-described ink carrier and (2) a colorant; (b) melting the ink; and (c) causing droplets of the melted ink to be ejected in an imagewise pattern onto a substrate.

DETAILED DESCRIPTION

The ink carrier (1) of this disclosure comprises (A) a colloidal dispersion of at least one of silica nanoparticles and metal oxide nanoparticles. The ink carrier can also include at least one (B) a low melting wax, and/or (C) a gelling agent. Phase change inks can comprise the above-described ink carrier (1) and (2) a colorant. The phase change ink can have a substantially low surface energy.

Nanometer sized particles, typically in the form of a colloidal dispersion of the nanoparticles, can be provided to control the transfuse properties of the inks. The surface properties of these particles can be chemically modified so as to produce ink-particle composites that have gel-like properties under specific temperature conditions usually below the selected jetting temperature and liquid-like properties at or above the jetting temperature. The colloidal dispersion of the nanoparticles are combined with the ink carrier so that there is a substantially uniform distribution of the nanoparticles within the ink matrices. Moreover, the ink is formed with a substantially reduced aggregation of the nanoparticles so that they are discretely distributed.

The nanoparticles can be used as an ink stabilizer. In this case, they can act as a nucleus for the crystallization of the ink carrier, in one embodiment crystallization of wax additives or of high melting components of low solubility. Moreover, the nanoparticles can be aligned along the network formed by the crystallization of the ink carrier, and in one embodiment aligned along a gelling agent network. This results in these inks having a unique morphology associated with the use of nanoparticles in which they can be self aligned and is resistant to substantial aggregation in the ink matrix. The alignment of the particles can be along the phase separated gel fibers and can be formed upon cooling. More particularly, the aligning of the nanoparticles can occur within the wax or in the polymeric matrix by adding a crystallizing gelling agent around which the particles can be attached. This morphology is particularly evident when semi-crystalline and/or crystalline-type gelling agents are used in the inks. If the melt is crystallized under directional stress, this can result in the nanoparticles being aligned in a substantially unitary direction thus providing asymmetric ink carrier materials. Thus, in one embodiment, if the melt is crystallized under directional stress, this will result in the particles being aligned in one direction thus providing asymmetric materials.

The nanoparticles can, in an embodiment herein, be dispersed in a solvent, such as a low boiling solvent, and can then be transferred from the solvent phase to the ink vehicles where they are uniformly disseminated in the ink carrier and in the low energy phase change ink. The solvent can in one embodiment be an organic solvent, and in another embodiment be a low boiling organic solvent. These solvents in one embodiment have a boiling point of equal to or less than about 140° C., in another embodiment have a boiling point of equal to or less than about 130° C., and in a further embodiment have a boiling point equal to or less than about 120° C., although the boiling point can be outside of these ranges. In one embodiment these solvents can be low boiling alcohols, glycols, glycol ethers, glycol acetates, ketones, acetamides, and the like, as well as mixtures thereof. In another embodiment, these solvents can be methanol, isopropanol, ethylene glycol, ethylene glycol mono-n-propyl ether, methyl ethyl ketone, methyl isobutyl ketone, propylene glycol mono-methyl ether acetate, N,N-dimethyl acetamide, and the like, as well as mixtures thereof. In another further embodiment the silica colloidal dispersions are commercially available from Nissan Chemicals America as ORGANOSILICASOL™ compounds. In still another embodiment these ORGANOSILICASOL™ compounds can include ORGANOSILICASOL™ MT-ST, ORGANOSILICASOL™ MA-ST-MS, ORGANOSILICASOL™ IPA-ST, ORGANOSILICASOL™ IPA-ST-MS, ORGANOSILICASOL™ IPA-ST-L, ORGANOSILICASOL™ IPA-ST-ZL, ORGANOSILICASOL™ IPA-ST-UP, ORGANOSILICASOL™ EG-ST, ORGANOSILICASOL™ NPC-ST-30, ORGANOSILICASOL™ MEK-ST, ORGANOSILICASOL™ MIK-ST-MS, ORGANOSILICASOL™ MIBK-ST, ORGANOSILICASOL™ PMA-ST, and ORGANOSILICASOL™ DMAC-ST, whose low boiling solvent components respectively correspond to the following compounds: methanol, isopropanol, ethylene glycol, ethylene glycol mono-n-propyl ether, methyl ethyl ketone, methyl isobutyl ketone, propylene glycol mono-methyl ether acetate, or N,N-dimethyl acetamide.

The loading of silica in the solvent in one embodiment is at at least about 15% by weight, in another embodiment is at at least about 20% by weight, and in a further embodiment is at least about 25% by weight, in one embodiment equal to or less than about 45 weight percent, in another embodiment equal to or less than about 40% by weight, and in a further embodiment equal to or less than about 35% by weight, although the loading can be outside of these ranges.

The nanoparticles are of any desired or effective particle size, in one embodiment having a particle size equal to or less than about 300 nm, in another embodiment having a particle size equal to or less than about 100 nm, and in yet another embodiment having a particle size equal to or less than about 50 nm, although the particle size can be outside of these ranges.

The nanoparticles (dry-weight) are present in the ink carrier in any desired or effective amount, in one embodiment of at least about 1% by weight of the ink, in another embodiment of at least about 5% by weight of the ink, and in yet another embodiment of at least about 10% by weight of the ink, and in one embodiment equal to or less than about 40% by weight of the ink, in another embodiment equal to or less than about 35% by weight of the ink, and in yet another embodiment equal to or less than about 25% by weight of the ink, although the amount can be outside of these ranges.

In another embodiment, the nanoparticles selected can be metal-oxide particles such as those commercially available from Nanophase Technologies: Nano Tek™ Aluminum Oxide, Nano Tek™ Antimony Tin Oxide and Nano Tek™ Zinc Oxide, the particles being prepared by a Physical Vapor Synthesis (PVS). These particles can be modified by Nanophase through a discrete particle encapsulation process to enhance their dispersability in various vehicles. In a further embodiment, the Nano Tek particles can be modified through a sol-gel process to form particles that can be easily dispersed in the liquid or solid inks disclosed herein. The inorganic particles can be added to a solvent such as toluene. From about 5 and equal to or less than 20 weight % of a silicon ester or mixture of silicon esters can be added. Mono, di and tri-alkoxy esters can be employed. The dispersion can then be subjected to high intensity sonication to initiate the sol-gel chemistry. No acid or base catalyst needs to be employed as the surface absorbed water acts to initiate hydrolysis under this high energy acoustical agitation. Hydrolysis and condensation can then proceed resulting in a surface passivation of the particles. After this treatment, the particles can form an optically transparent dispersion which shows substantially no tendency to settle. In an additional embodiment, the Nano Tek™ particles are modified to produce on the surface moieties that have strong H-bonding capabilities. In such an embodiment these particles can be tecton-modified nanoparticles. In yet another embodiment, the tecton-modified nanoparticles can be functionalized so as to contain monomer that can participate in certain polymerization reactions such as, for example, UV or thermally initiated polymerization processes. In another embodiment, the nanoparticles are colloidal antimonyl pentoxide surface treated particles with ethoxylated amides, such materials being available from Nyacol Nanotehcnologies Inc., Ashland, Mass., and sold under tradenames ADP 480 and ADP 494. The UV curable functionalized nanoparticles can be employed in the ink carrier disclosed herein in any desired or effective amount, in one embodiment of at least about 0.1% by weight of the ink, in another embodiment of at least about 5% by weight of the ink, and in yet another embodiment of at least about 10% by weight of the ink, and in one embodiment equal to or less than about 40% by weight of the ink, in another embodiment equal to or less than about 35% by weight of the ink, and in yet another embodiment equal to or less than about 25% by weight of the ink, although the amount can be outside of these ranges.

A low melting wax can be employed in the ink carrier disclosed herein. The low melting wax can comprise a polyalkylene wax, such as a polyethylene wax, a polypropylene wax, mixtures thereof, or the like. The polyalkylene wax(es) is present in the ink carrier in any desired or effective amount, in one embodiment of at least about 25% by weight of the ink carrier, in another embodiment of at least about 30% by weight of the ink carrier, and in yet another embodiment of at least about 35% by weight of the ink carrier, and in one embodiment equal to or less than about 65% by weight of the ink carrier, in another embodiment equal to or less than about 55% by weight of the ink carrier, and in yet another embodiment equal to or less than about 45% by weight of the ink carrier, although the amount can be outside of these ranges.

Examples of suitable polyalkylene waxes include POLYWAX® 500 (commercially available from Baker Petrolite) and distilled POLYWAX® 500, in one embodiment having a viscosity at a jetting temperature of about 110 degree C. of about 10% to about 100% higher than the viscosity of the undistilled POLYWAX® 500, POLYWAX® 400 commercially available from Baker Petrolite and distilled POLYWAX® 400, VYBAR® 103 and VYBAR® 253 commercially available from Baker Petrolite, and POLYWAX® 655.

Higher molecular weight POLYWAX® materials can also suitable. The molecular weight of the polyalkylene wax is in an embodiment of this disclosure in the range of 500 to 600 g/mole with a polydispersity equal to or less than about 1.1, in another embodiment equal to or less than about 1.05, and in a further embodiment equal to or less than about 1.0.

The low melting wax component in the ink carrier can also comprise functional wax(es) which can also be included in the ink carrier. In one embodiment functional alcohol waxes can be employed herein. In a further embodiment the functional alcohol wax can be a mono-functional alcohol wax, a di-functional alcohol wax, a tri-functional alcohol wax, a tetra-functional alcohol wax, or mixtures thereof. The functional alcohol wax(es) is present in the ink carrier in any desired or effective amount, in one embodiment of at least about 20% by weight of the ink carrier, in another embodiment of at least about 25% by weight of the ink carrier, and in yet another embodiment of at least about 30% by weight of the ink carrier, and in one embodiment of equal to or less than about 65% by weight of the ink carrier, in another embodiment equal to or less than about 55% by weight of the ink carrier, and in yet another embodiment equal to or less than about 45% by weight of the ink carrier, although the amount can be outside of these ranges.

In an embodiment of this disclosure, at least a portion of the functional waxes can be mono-functional wax which can be substituted with a di-, tri- and/or tetra-functional wax. The substitution can be done in one embodiment at a predetermined hydroxyl number for the resultant ink. The hydroxyl number (ASTM E-222-00 mod.) of the ink carrier is in one embodiment of at least about 20, in another embodiment of at least about 25, and in yet another embodiment of at least about 35, and in one embodiment equal to or less than about 100, in another embodiment equal to or less than about 80, and in yet another embodiment equal to or less than about 50, although the hydroxyl number can be outside of these ranges. In another embodiment, the functional wax(es) can have a melting temperature of at least about 50° C., in another embodiment at least about 60° C., and in another embodiment at least about 70° C., and in one embodiment equal to or less than about 110° C., in a further embodiment equal to or less than about 105° C., and in yet another embodiment equal to or less than about 100° C., although the temperature can be outside of these ranges.

Examples of suitable functional waxes include UNILIN® 350 and UNILIN® 425 (commercially available from Baker Petrolite), and the distilled fractions of these functional waxes. In one embodiment, the viscosity of the distilled functional wax at the jetting temperature is from about 5 to equal to or less than about 50% higher than the non distilled functional wax(es). Other examples of functional waxes can be a 1-docosanol wax commercially available from Aldrich. Mono functional waxes which can be employed herein are the waxes of 1-tetradecanol, 1-pentadecanol, 1-hexadecanol, 1-heptadecanol, 1-octadecanol, 1-nonadecanol, 1-eicosanol, 1-tricosanol, 1-tetracosanol, 1-pentacosanol, 1-hexacosanol, 1-heptacosanol, 1-octacosanol, 1-nonacosanol, 1-tricontanol, 1-dotriacontanol, 1-tritriacontanol, 1-tetratriacontanol. Guerbet alcohols can also be suitable such as 2-tetradecyl 1-octadecanol, 2-hexadecyl 1-eicosanol, 2-octadecyl 1-docosanol, 2-nonadecyl 1-tricosanol, 2-eicosyl tetracosanol, and mixtures thereof. Di-functional waxes can include the waxes of diols such as 1,8-octanediol, 1,9-nonanediol, 1,10-decanediol, 1,12-dodecanediol, 1,13-tridecanediol, 1,14-tetradecanediol, 1,15-pentadecanediol, 1,16-hexadecanediol, 1,17-heptadecanediol, 1,18-octadecanediol, 1,19-nonadecanediol, 1,20-eicosanediol, 1,22-docosanediol, 1,25-pentacosanediol, and mixtures thereof. Other polyhydric alcohols that can be used in the ink are trimethylolpropane, pentaerythritol, neopentylglycol, mannitol, sorbitol, and mixtures thereof, including mixtures with mono- and di-functionalized alcohols above.

In one embodiment, the polyalkylene wax and functional wax can be employed in weight ratio of at least about 0.35, in another embodiment at least about 0.40 and in a further embodiment at least about 0.45, and in another embodiment equal to or less than to 0.65, in a further embodiment equal to or less than about 0.60, and in still a further embodiment equal to or less than about 0.55, although the weight ratio can be outside of these ranges.

The subject low energy phase change ink can also include a gelling agent. The gelling agent can comprise a crystalline or semi-crystalline gelling agent. In one embodiment, the gelling agent is an ester-terminated amide which can be employed in the ink carrier. The ester-terminated amide is a semi-crystalline gelling agent that forms a clear gel. Examples of suitable ester-amide compounds and the preparation thereof are disclosed in, for example, U.S. Pat. No. 5,863,319, U.S. Pat. No. 5,645,632, and U.S. Pat. No. 5,783,657, the disclosures of each of which are totally incorporated herein by reference. Suitable ester-amides are also commercially available as, for example, UNI-REZ® 2980 and UNI-CLEAR® 100 (commercially available from Arizona Chemical), and the like.

In one specific embodiment, the ester-amide compound has a melting point of at least about 50° C., although the melting point can be outside of this range. In one specific embodiment, the ester-amide compound has a melting point of no more than about 160° C., although the melting point can be outside of this range. In one specific embodiment, the ester-amide compound has a viscosity at about 140° C. of at least about 20 centipoise, although the viscosity can be outside of this range. In one specific embodiment, the ester-amide compound has a viscosity at about 140° C. of no more than about 400 centipoise, although the viscosity can be outside of this range.

The ester-amide is present in the ink carrier in any desired or effective amount, in one specific embodiment at least about 0.5% by weight, in another embodiment at least about 3% by weight, and in yet another embodiment at least about 6% by weight, and in one embodiment no more than about 30% by weight, in another embodiment no more than about 20% by weight, and in yet another embodiment no more than about 15% by weight, although the amount can be outside of these ranges.

In another embodiment, the gelling agent is a urea gelling agent. In one specific embodiment the urea gelling agent is a dialkyl urea material. Specific examples of suitable urea gelling agents include (but are not limited to) those of the formula:

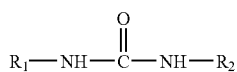

the urea gelling is N,N'-distearylurea, it can be synthesized as described in Example 1. wherein $R_1$ and $R_2$ is each, independently of the other, (i) an alkyl group, including linear, branched, saturated, unsaturated, cyclic, substituted, and unsubstituted alkyl groups, and wherein hetero atoms, such as oxygen, nitrogen, sulfur, silicon, phosphorus, boron, and the like either may or may not be present in the alkyl group, in one embodiment with at least 1 carbon atom, in another embodiment with at least about 4 carbon atoms, and in yet another embodiment with at least about 10 carbon atoms, and in one embodiment equal to or less than about 100 carbon atoms, in another embodiment equal to or less than about 60 carbon atoms, and in yet another embodiment equal to or less than about 30 carbon atoms, although the number of carbon atoms can be outside of these ranges, and in yet a further embodiment including (1) linear saturated unsubstituted aliphatic groups containing no hetero atoms, (2) branched saturated unsubstituted aliphatic groups containing no hetero atoms, (3) cyclic saturated unsubstituted aliphatic groups containing no hetero atoms, (4) aliphatic groups containing both cyclic and acyclic portions, said aliphatic groups being saturated, unsubstituted, and containing no hetero atoms, (5) linear ethylenically unsaturated unsubstituted aliphatic groups containing no hetero atoms, (6) branched ethylenically unsaturated unsubstituted aliphatic groups containing no hetero atoms, (7) cyclic ethylenically unsaturated unsubstituted aliphatic groups containing no hetero atoms, (8) aliphatic groups containing both cyclic and acyclic portions, said aliphatic groups being ethylenically unsaturated, unsubstituted, and containing no hetero atoms, (9) linear saturated substituted aliphatic groups containing no hetero atoms, (10) branched saturated substituted aliphatic groups containing no hetero atoms, (11) cyclic saturated substituted aliphatic groups containing no hetero atoms, (12) aliphatic groups containing both cyclic and acyclic portions, said aliphatic groups being saturated, substituted, and containing no hetero atoms, (13) linear ethylenically unsaturated substituted aliphatic groups containing no hetero atoms, (14) branched ethylenically unsaturated substituted aliphatic groups containing no hetero atoms, (15) cyclic ethylenically unsaturated substituted aliphatic groups containing no hetero atoms, (16) aliphatic groups containing both cyclic and acyclic portions, said aliphatic groups being ethylenically unsaturated, substituted, and contain no hetero atoms, (17) linear saturated unsubstituted aliphatic groups containing hetero atoms, (18) branched saturated unsubstituted aliphatic groups containing hetero atoms, (19) cyclic saturated unsubstituted aliphatic groups containing hetero atoms, (20) aliphatic groups containing both cyclic and acyclic portions, said aliphatic groups being saturated, unsubstituted, and containing hetero atoms, (21) linear ethylenically unsaturated unsubstituted aliphatic groups containing hetero atoms, (22) branched ethylenically unsaturated unsubstituted aliphatic groups containing hetero atoms, (23) cyclic ethylenically unsaturated unsubstituted aliphatic groups containing hetero atoms, (24) aliphatic groups containing both cyclic and acyclic portions, said aliphatic groups being ethylenically unsaturated, unsubstituted, and containing hetero atoms, (25) linear saturated substituted aliphatic groups containing hetero atoms, (26) branched saturated substituted aliphatic groups containing hetero atoms, (27) cyclic saturated substituted aliphatic groups containing hetero atoms, (28) aliphatic groups containing both cyclic and acyclic portions, said aliphatic groups being saturated, substituted, and containing hetero atoms, (29) linear ethylenically unsaturated substituted aliphatic groups containing hetero atoms, (30) branched ethylenically unsaturated substituted aliphatic groups containing hetero atoms, (31) cyclic ethylenically unsaturated substituted aliphatic groups containing hetero atoms, and (32) aliphatic groups containing both cyclic and acyclic portions, said aliphatic groups being ethylenically unsaturated, substituted, and containing hetero atoms, (ii) an aryl group (including substituted and unsubstituted aryl groups, and wherein hetero atoms, such as oxygen, nitrogen, sulfur, silicon, phosphorus, boron, and the like either may or may not be present in the aryl group), in one embodiment with at least about 5 carbon atoms, and in another embodiment with at least about 6 carbon atoms, and in one embodiment with no more than about 18 carbon atoms, in another embodiment with no more than about 12 carbon atoms, and in yet another embodiment with no more than about 6 carbon atoms, although the number of carbon atoms can be outside of these ranges, (iii) an arylalkyl group (including substituted and unsubstituted arylalkyl groups, and wherein hetero atoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as benzyl or the like, or (iv) an alkylaryl group (including substituted and unsubstituted alkylaryl groups, and wherein hetero atoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges. For instance, when the urea gelling is N,N'-distearylurea, it can be synthesized as described in Example 1.

In one specific embodiment, urea gelling agent has a melting point of at least about 60° C., although the melting point can be outside of this range. In one specific embodiment, the ester-amide compound has a melting point of no more than about 160° C., although the melting point can be outside of this range. In one specific embodiment, the urea gelling agent has a viscosity at about 120° C. of at least about 15 centipoise, although the viscosity can be outside of this range. In one specific embodiment, the urea gelling agent has a viscosity at about 120° C. of no more than about 200 centipoise, although the viscosity can be outside of this range.

The urea gelling agent is present in the ink carrier in any desired or effective amount, in one specific embodiment at least about 0.5% by weight, in another embodiment at least about 3% by weight, and in yet another embodiment at least about 6% by weight, and in one embodiment no more than about 30% by weight, in another embodiment no more than about 20% by weight, and in yet another embodiment no more than about 15% by weight, although the amount can be outside of these ranges.

A plasticizer, which can be either a solid or liquid plasticizer, such as benzyl phthalates, triaryl phosphate esters, pentaerythritol tetrabenzoate, dialkyl adipate, dialkyl phthalates, dialkyl sebacate, alkyl benzyl phthalates, ethylene glycol monostearate, glycerol monostearate, propylene glycol monostearate, dicyclohexyl phthalate, diphenyl isophthalate, triphenyl phosphate, dimethyl isophthalate, and mixtures thereof, or the like can also be included in the ink carrier. The plasticizer is present in the ink carrier in any desired or effective amount, in one embodiment of at least about 0.05% by weight of the ink carrier, in another embodiment of at least about 1% by weight of the ink carrier, and in yet another embodiment of at least about 2% by weight of the ink carrier, and in one embodiment of equal to or less than about 15% by weight of the ink carrier, in another embodiment of equal to or less than about 10% by weight of the ink carrier, and in yet another embodiment of equal to or less than about 5% by weight of the ink carrier, although the amount can be outside of these ranges. Examples of suitable plasticizers include SANTICIZER® 278, SANTICIZER® 154, SANTICIZER®160, SANTICIZER® 261 (commercially available from Monsanto), and the like or mixtures thereof.

A hindered amine antioxidant is present in the ink in any desired or effective amount, in one embodiment of at least about 0.001 percent by weight of the ink carrier, in another embodiment of at least about 0.05 percent by weight of the ink carrier, and in yet another embodiment of at least about 0.10 percent by weight of the ink carrier, and in one embodiment of equal to or less than about 0.50 percent by weight of the ink carrier, in another embodiment of equal to or less than about 0.25 percent by weight of the ink carrier, and in yet another embodiment of equal to or less than about 0.15 percent by weight of the ink carrier, although the amount can be outside of these ranges.

Examples of suitable hindered amine antioxidants include those of general formula

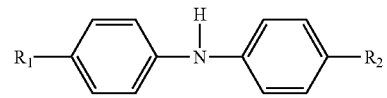

Wherein $R_1$ and $R_2$ each, independently of the other, can be a hydrogen atom or an alkyl group, including linear, branched, saturated, unsaturated, cyclic, substituted, and unsubstituted alkyl groups, and wherein hetero atoms, such as oxygen, nitrogen, sulfur, silicon, phosphorus, boron, either may or may not be present in the alkyl group, in one embodiment with at least 1 carbon atom.

Specific examples of suitable hindered amine antioxidants include the following antioxidants commercially available from Crompton; NAUGUARD® 445 where $R_1=R_2=C(CH_3)_2Ph$, NAUGUARD® 635 where $R_1=R_2=-CH(CH_3)Ph$, NAUGUARD® PS-30 where $R_1=C_4$ or $C_8$, $R_2=C_4$ or $C_8$ and the like.

A hindered phenol antioxidant can also be provided. In one embodiment the hindered phenol is present in a relatively high concentration. A high concentration of hindered phenol antioxidant maximizes long term thermal stability by delaying the onset of the oxidation itself. The hindered phenol antioxidant is present in the ink in any desired or effective amount, in one embodiment of at least about 0.01% by weight of the ink carrier, in another embodiment of at least about 0.5% by weight of the ink carrier, and in yet another embodiment of at least about 1.5% by weight of the ink carrier, and in one embodiment equal to or less than about 4.0% by weight of the ink carrier, in another embodiment equal to or less than about 3.0% by weight of the ink carrier, and in yet another embodiment equal to or less than about 2.5% by weight of the ink carrier, although the amount can be outside of these ranges. Specific examples of suitable hindered phenol antioxidants include ETHANOX® 330, ETHANOX® 310, ETHANOX® 314, ETHANOX® 376 (commercially available from Albemarle) and the like. Also commercially available from Ciba Specialty Chemicals are IRGANOX® 1010, IRGANOX® 1035, IRGANOX® 1076, IRGANOX® 1330 and the like. Mixtures of two or more of these hindered phenol antioxidants can also be employed.

A dispersant can be present in the ink in any desired or effective amount for purposes of dispersing and stabilizing the pigment, and the silica or alternative nanoparticles present in the ink vehicle. The dispersant is present in any desired or effective amount, in one embodiment of at least about $1\times10^{-5}\%$ by weight of the ink carrier, in another embodiment of at least about $1\times10^{-3}\%$ by weight of the ink carrier, and in yet another embodiment of at least about $5\times10^{-1}\%$ by weight of the ink carrier, and in one embodiment equal to or less than about 30% by weight of the ink carrier, in another embodiment equal to or less than about 20% by weight of the ink carrier, and in yet another embodiment equal to or less than about 10% by weight of the ink carrier, although the amount can be outside of these ranges. Specific examples of suitable dispersants are polyalkylene succinimide dispersants such as those disclosed in U.S. Pat. No. 6,858,070, the disclosure of which is totally incorporated herein by reference. Dispersants can include the Chevron Oronite OLOA 11000, OLOA 11001, OLOA 11002, OLOA 11005, OLOA 371, OLOA 375, OLOA 411, OLOA 4500, OLOA 4600, OLOA 8800, OLOA 8900, OLOA 9000, OLOA 9200 and the like, commercially available from Chevron Oronite Company LLC, Houston, Tex., as well as mixtures thereof. Examples of suitable polyalkylene succinimides and their precursors and methods of making them are disclosed in, for example, U.S. Pat. No. 3,172,892, U.S. Pat. No. 3,202,678, U.S. Pat. No. 3,280,034, U.S. Pat. No. 3,442,808, U.S. Pat. No. 3,361,673, U.S. Pat. No. 3,172,892, U.S. Pat. No. 3,912,764, U.S. Pat. No. 5,286,799, U.S. Pat. No. 5,319,030, U.S. Pat. No. 3,219,666, U.S. Pat. No. 3,381,022, U.S. Pat. No. 4,234,435, and European Patent Publication 0 776 963, the disclosures of each of which are totally incorporated herein by reference.

A rosin ester resin, mixtures thereof, or the like can also be included in the ink carrier. The rosin ester resin is present in the ink carrier in any desired or effective amount, in one embodiment of at least about 0.5% by weight of the ink carrier, in another embodiment of at least about 2% by weight of the ink carrier, and in yet another embodiment of at least about 3% by weight of the ink carrier, and in one embodiment of equal to or less than about 20% by weight of the ink carrier, in another embodiment equal to or less than about 15% by weight of the ink carrier, and in yet another embodiment equal to or less than about 10% by weight of the ink carrier, although the amount can be outside of these ranges. Examples of suitable rosin ester resins include PINECRYSTAL® KE-100 (commercially available from Arakawa), and the like.

Fatty amides, such as monoamides, diamides, triamides and tetraamides, mixture thereof, or the like can also be included in the ink carrier. The amide can be present in one embodiment in an amount of at least about 1% by weight of the ink carrier, in another embodiment of at least about 2% by weight of the ink carrier, and in yet another embodiment of at least about 3% by weight of the ink carrier, and in one embodiment equal to or less than about 30% by weight of the ink carrier, in another embodiment equal to or less than about 15% by weight of the ink carrier, and in yet another embodiment equal to or less than about 5% by weight of the ink carrier, although the amount can be outside of these ranges. Examples of suitable amides include stearyl stearamide, a tetra amide resin obtained from the reaction of one equivalent of dimer acid with two equivalents of ethylene diamine and UNICID® 700 (commercially available from Baker Petrolite), a carboxylic acid derivative of a long chain alcohol), prepared as described in Example 1 of U.S. Pat. No. 6,174,937, column 49, line 53 to column 50, line 27, the entire disclosure of U.S. Pat. No. 6,174,937 being totally incorporated herein by reference.

The ink carrier may contain a branched triamide such as those described in U.S. Pat. No. 6,860,930, the disclosure of which is totally included here by reference.

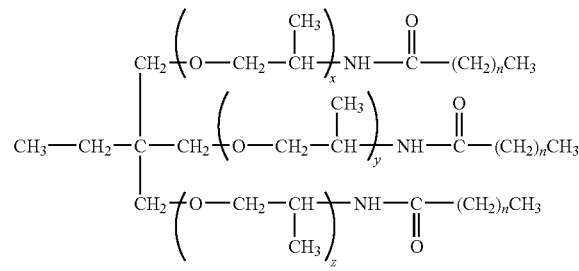

Wherein n has an average value of from about 34 equal to or less than 40, where x, y and z can each be zero or an integer, and wherein the sum of x, y, and z is from about 5 and equal to or less than 6.

The inks disclosed herein can be obtained by dispersing the colloidal silica dispersions into the ink components in such a manner as to maximize uniform dispersion and resist substantial aggregation. This can include the step of removing a substantial portion of the solvent from the solvent-silica nanoparticles, and disseminating the colloidal silica dispersion within the ink carrier components. More specifically, the method for producing a low energy phase change ink composition can comprise combining together an ink carrier comprising a colloidal dispersion of nanoparticles comprising nanoparticles in a solvent, a low melting wax, and a gelling agent. The ink carrier exhibits a substantially uniform distribution of said nanoparticles discretely distributed therewithin, and exhibits a substantially increased resistance to aggregation of the nanoparticles distributed therewithin. The method can comprise combining the low melting wax and the gelling agent with the nanoparticles in a solvent while evaporating said solvent to form a substantially homogeneous solution of said ink carrier. Then, the colorant is added to the substantially homogeneous solution of the ink carrier to form the low energy phase change ink composition.

In one embodiment a representative process for disseminating the colloidal silica dispersion is described below:

1. Add selected polar resins (for example, a hydroxyfunctional wax, an ester amide, and N,N distearylurea, to the desired amount of colloidal silica dispersion. Optionally, add additional solvent, e.g. methyl ethyl ketone (MEK) to obtain a fluid dispersion, while mixing the solution at a temperature in the range of 40 to 70 degree C.

2. Stir fluid dispersion for about 1.5 to 2 hours at temperature.

3. Increase temperature to about 80° C. and slowly evaporate solvent until a viscous solution is obtained.

4. Further increase the temperature of the viscous solution to facilitate dissolution/melting of the ink components, typically up to about 125° C. (as high as 140° C.).

5. Maintain the temperature of the viscous solution until a clear solution is obtained.

6. Add low polarity ink components, e.g, polyethylene wax, slowly while stirring until a homogeneous solution is obtained.

7. Add selected colorant to give final ink containing nanoparticles.

The ink carrier can be present in the phase change ink prepared in any desired or effective amount, in one embodiment in an amount of at least about 50% by weight of the ink, in another embodiment of at least about 70% by weight of the ink, and in yet another embodiment of at least about 90% by weight of the ink, and in one embodiment equal to or less than about 99% by weight of the ink, in another embodiment equal to or less than about 98% by weight of the ink, and in yet another embodiment equal to or less than about 95% by weight of the ink, although the amount can be outside of these ranges.

In one specific embodiment, the ink carrier has a melting point of less than about 110° C., and in another embodiment of less than about 100° C., although the melting point of the ink carrier can be outside of these ranges.

The phase change ink compositions also contain a colorant. Any desired or effective colorant can be employed, including dyes, pigments, mixtures thereof, and the like, provided that the colorant can be dissolved or dispersed in the ink vehicle. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 26050] (BASF), Intratherm Yellow 346 commercially available from Crompton and Knowles, C.I. Disperse Yellow 238, Neptune Red Base NB543 (BASF, C.I. Solvent Red 49), Neopen Blue FF-4012 commercially available from BASF, Lampronol Black BR commercially available from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are totally incorporated herein by reference, and commercially available from, for example, Milliken & Company as Milliken Ink Yellow 12, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the phase change inks. Examples of suitable pigments include Violet Toner VT-8015 (commercially available from Paul Uhlich); Paliogen Violet 5100 (commercially available from BASF); Paliogen Violet 5890 (commercially available from BASF); Permanent Violet VT 2645 (commercially available from Paul Uhlich); Heliogen Green L8730 (commercially available from BASF); Argyle Green XP-111-S (commercially available from Paul Uhlich); Brilliant Green Toner GR 0991 (commercially available from Paul Uhlich); Lithol Scarlet D3700 (commercially available from BASF); Toluidine Red (commercially available from Aldrich); Scarlet for Thermoplast NSD PS PA (commercially available from Ugine Kuhlmann of Canada); E.D. Toluidine Red (commercially available from Aldrich); Lithol Rubine Toner (commercially available from Paul Uhlich); Lithol Scarlet 4440 (commercially available from BASF); Bon Red C (commercially available from Dominion Color Company); Royal Brilliant Red RD-8192 (commercially available from Paul Uhlich); Oracet Pink RF (commercially available from Ciba-Geigy); Paliogen Red 3871K (commercially available from BASF); Paliogen Red 3340 (commercially available from BASF); Lithol Fast Scarlet L4300 (commercially available from BASF); Heliogen Blue L6900, L7020 (commercially available from BASF); Heliogen Blue K6902, K6910 (commercially available from BASF); Heliogen Blue D6840, D7080 (commercially available from BASF); Sudan Blue OS (commercially available from BASF); Neopen Blue FF4012 (commercially available from BASF); PV Fast Blue B2G01 (commercially available from American Hoechst); Irgalite Blue BCA (commercially available from Ciba-Geigy); Paliogen Blue 6470 (commercially available from BASF); Sudan III (commercially available from Red Orange) (commercially available from Matheson, Colemen Bell); Sudan II (commercially available from Orange) (commercially available from Matheson, Colemen Bell); Sudan Orange G (commercially available from Aldrich), Sudan Orange 220 (commercially available from BASF); Paliogen Orange 3040 (commercially available from BASF); Ortho Orange OR 2673 (commercially available from Paul Uhlich); Paliogen Yellow 152, 1560 (commercially available from BASF); Lithol Fast Yellow 0991K (commercially available from BASF); Paliotol Yellow 1840 (commercially available from BASF); Novoperm Yellow FGL (commercially available from Hoechst); Permanent Yellow YE 0305 (commercially available from Paul Uhlich); Lumogen Yellow D0790 (commercially available from BASF); Suco-Yellow L1250 (commercially available from BASF); Suco-Yellow D1355 (commercially available from BASF); Suco Fast Yellow D1355, D1351 (commercially available from BASF); Hostaperm Pink E (commercially available from American Hoechst); Fanal Pink D4830 (commercially available from BASF); Cinquasia Magenta (commercially available from Du Pont); Paliogen Black L0084 (commercially available from BASF); Pigment Black K801 (commercially available from BASF); and carbon blacks such as REGAL 330® (commercially available from Cabot), Carbon Black 5250, Carbon Black 5750 (commercially available from Columbia Chemical), and the like.

Also suitable are the colorants disclosed in U.S. Pat. No. 6,472,523, application U.S. Ser. No. 10/072,210, filed Feb. 8, 2002, entitled "Ink Compositions Containing Phthalocyanines," U.S. Pat. No. 6,476,219, U.S. Pat. No. 6,576,747, application U.S. Ser. No. 10/185,994, filed Jun. 27, 2002, entitled "Dimeric Azo Pyridone Colorants," application U.S. Ser. No. 10/184,269, filed Jun. 27, 2002, entitled "Phase Change Inks Containing Dimeric Azo Pyridone Colorants," application U.S. Ser. No. 10/185,264, filed Jun. 27, 2002, entitled "Phase Change Inks Containing Azo Pyridone Colorants," U.S. Pat. No. 6,590,082, application U.S. Ser. No. 10/185,597, filed Jun. 27, 2002, entitled "Process for Preparing Substituted Pyridone Compounds," U.S. Pat. No. 6,576,748, application U.S. Ser. No. 10/186,023, filed Jun. 27, 2002, entitled "Dimeric Azo Pyridone Colorants," application U.S. Ser. No. 10/184,266, filed Jun. 27, 2002, entitled "Phase Change Inks Containing Dimeric Azo Pyridone Colorants," application U.S. Ser. No. 10/260,146, filed Sep. 27, 2002, entitled "Colorant Compounds," and application U.S. Ser. No. 10/260,379, filed Sep. 27, 2002, "Methods for Making Colorant Compounds," the disclosures of each of which are totally incorporated herein by reference.

The colorant is present in the phase change ink in any desired or effective amount to obtain the desired color or hue, in one embodiment at least about 0.1% by weight of the ink, in another embodiment at least about 0.2% by weight of the ink, and in a further embodiment at least about 0.5% by weight of the ink, and in one embodiment equal to or less than about 30% by weight of the ink, in another embodiment equal to or less than about 20% by weight of the ink, and in a further embodiment equal to or less than about 10% by weight of the ink, although the amount can be outside of these ranges.

The ink compositions disclosed herein in one embodiment have melting points in one embodiment equal to or less than about 130° C., in another embodiment equal to or less than about 120° C., in a further embodiment equal to or less than about 110° C., and in still another embodiment equal to or less than about 100° C., although the melting point can be outside of these ranges.

The ink compositions prepared by the process disclosed herein generally have melt viscosities, at the jetting temperature which can be equal to or less than about 145° C., in one embodiment equal to or less than about 130° C., and in another embodiment equal to or less than about 120° C., in a further embodiment equal to or less than about 110° C., and in yet another embodiment equal to or less than about 80° C., although the jetting temperature can be outside of these ranges, which are in one embodiment equal to or less than about 30 cps, in another embodiment equal to or less than about 25 cps, and in yet a further embodiment equal to or less than about 20 cps, and in another embodiment no less than about 2 cps, in a further embodiment no less than about 3 cps, and in yet a further embodiment no less than about 4 cps, although the melt viscosity can be outside of these ranges.

Showthrough is defined herein as the increase in paper OD (background subtracted) that results from the presence of a solid area image on the reverse side of the paper.

With regard to the subject inks, showthrough can be substantially reduced so that the printed image in one embodiment is equal to or less than about 0.07 optical density units, in another embodiment is equal to or less than about 0.06 optical density units, in a further embodiment is equal to or less than about 0.05 optical density units, and in a yet further embodiment is equal to or less than about 0.04 optical density units, although the level of showthrough can be outside of these ranges.

The inks disclosed herein can be employed in apparatus for direct printing ink jet processes and in indirect (offset) printing ink jet applications. Another embodiment is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. The inks prepared as disclosed herein can be employed in apparatus for indirect (offset) printing ink jet applications. Another embodiment is directed to a process which comprises incorporating an ink prepared as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, Hammermill Laserprint Paper, and the like, transparency materials, fabrics, textile products, plastics, polymeric films, inorganic substrates such as metals and wood, and the like.

Specific embodiments will now be described in detail. These examples are intended to be illustrative, and the claims are not limited to the materials, conditions, or process parameters set forth in these embodiments.

EXAMPLE 1

A urea gelling agent, N,N'-distearylurea, was synthesized as follows: Octadecylamine (1 eq, 0.0886 mol, 23.879 g) was dissolved in hexane (1L) in a 2L 1 neck round bottomed flask. A solution of octadecyl isocyanate (1 eq, 0.0886 mol, 26.18 g) in hexane (500 ml) was slowly added to the amine solution through an addition funnel. The mixture was stirred for 1 hr during which a white precipitate was formed. IR was used to confirm completion of reaction. The white precipitate was filtered and dried under vacuum overnight to give product as a white powder (46.11 g, 95% yield). The product had a formula as follows

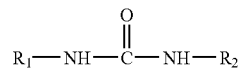

Wherein $R_1$ and $R_2$ are both $(CH_3(CH2)_{17}$. The product had a melting point of 117° C. and a complex viscosity of 45.0 cps at 120° C. The product was shown to be pure by proton NMR.

EXAMPLE 2

A number of low energy phase change inks were formulated, characterized and evaluated for viscosity. Table 1 shows the compositions of 4 silica inks and of a control ink containing no silica. The viscosity was found to increase linearly with the increase in the concentration of nanoparticles in the ink as it can be shown from an analysis of the viscosity data reported below. The viscosity requirement for jettability was achieved for all inks.

TABLE 1

Control Ink and Formulations of Inks Containing Nanoparticles

|  | Ink 1 wt % | Ink 2 wt % | Ink 3 wt % | Ink 4 wt % | Ink 5 wt % |
| --- | --- | --- | --- | --- | --- |
| Silica | 0.00 | 13.06 | 16.89 | 20.04 | 17.33 |
| Polywax 500 | 46.20 | 40.12 | 38.32 | 36.91 | 39.37 |
| Unilin 425 | 30.40 | 26.37 | 25.25 | 24.30 | 25.92 |

TABLE 1-continued

Control Ink and Formulations of Inks Containing Nanoparticles

| | Ink 1 wt % | Ink 2 wt % | Ink 3 wt % | Ink 4 wt % | Ink 5 wt % |
|---|---|---|---|---|---|
| Uniclear 100 | 9.98 | 8.73 | 8.37 | 8.01 | 8.57 |
| Cyan Dye | 2.95 | 2.60 | 2.48 | 2.39 | 2.58 |
| KE 100 | 5.05 | 4.44 | 4.21 | 4.04 | 4.28 |
| Santicizer 278 | 2.04 | 1.73 | 1.67 | 1.62 | 1.74 |
| Tetra-amide Resin | 3.12 | 2.72 | 2.60 | 2.48 | 0.00 |
| Nauguard 445 | 0.26 | 0.23 | 0.21 | 0.20 | 0.21 |
| TOTAL (%) | 100 | 100 | 100 | 100 | 100 |

These inks were formulated as follows:

Ink 1:

A cyan ink composition was prepared in a beaker by adding (1) 46.20 grams of polyethylene wax (PE 500, obtained from Baker Petrolite, Tulsa, Okla., a polyethylene homopolymer with an average chain length of C-36), (2) 30.40 grams of a linear primary long chain alcohol (UNILIN® 425, obtained from Baker Petrolite, Tulsa, Okla., with an average chain length of C-30), (3) 5.05 grams of a glycerol ester of hydrogenated (rosin) acid (KE-100, obtained from Arakawa Chemical Industries, Ltd, Osaka, Japan), (4) 2.04 gram of an alkylbenzyl phthalate of the formula

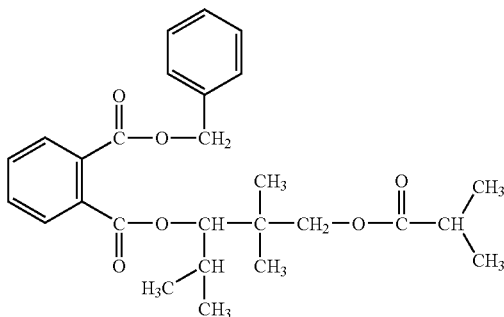

(SANTICIZER® 278, obtained from Ferro Corporation, Bridgeport, N.J.), (5) 0.26 gram of NAUGUARD® 445 antioxidant (obtained from Uniroyal Chemical Co., Middlebury, Conn.), and (6) 9.98 parts by weight of the commercial ester terminated polyamide (Uniclear 100, available from Arizona Chemicals, Jacksonville, Fla.) and (7) 3.12 grams of a tetra amide resin obtained from the reaction of one equivalent of dimer acid with two equivalents of ethylene diamine and UNICID® 700 (obtained from Baker Petrolite, Tulsa, Okla., a carboxylic acid derivative of a long chain alcohol), prepared as described in Example 1 of U.S. Pat. No. 6,174,937, the disclosure of which is totally incorporated herein by reference. The materials were melted together at a temperature of about 135° C. and stirred for about 2 hours at about 500 rpm. To this mixture was then added (9) 2.95 grams of the cyan colorant disclosed in Example VIII of U.S. Pat. No. 6,472, 523, the disclosure of which is totally incorporated herein by reference. The ink was stirred for about 2 additional hours and then cooled to room temperature. The cyan ink thus prepared exhibited a viscosity of about 8.2 centipoise as measured by a Rheometric Instrument RFS III parallel-plate viscometer at about 120° C.

Ink 2:

A cyan ink composition was prepared as follows: (1) adding in a beaker while mixing in the temperature range of 40 to 70 degrees C. the following components (a) to (f): (a) 26.37 grams of a linear primary long chain alcohol (UNILIN® 425, obtained from Baker Petrolite, Tulsa, Okla., with an average chain length of C-30), (b) 4.44 grams of a glycerol ester of hydrogenated (rosin) acid (KE-100, obtained from Arakawa Chemical Industries, Ltd, Osaka, Japan), (c) 1.73 gram of an alkylbenzyl phthalate of the formula

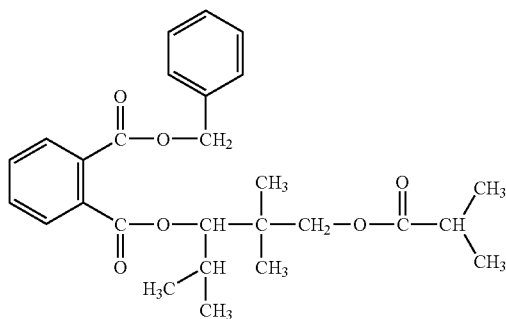

(SANTICIZER® 278, obtained from Ferro Corporation, Bridgeport, N.J.), (d) 0.23 gram of NAUGUARD® 445 antioxidant (obtained from Uniroyal Chemical Co., Middlebury, Conn.), and (e) 8.73 parts by weight of the commercial ester terminated polyamide (Uniclear 100, available from Arizona Chemicals, Jacksonville, Fla.) and (f) 2.72 grams of a tetra amide resin obtained from the reaction of one equivalent of dimer acid with two equivalents of ethylene diamine and UNICID® 700 (obtained from Baker Petrolite, Tulsa, Okla., a carboxylic acid derivative of a long chain alcohol), prepared as described in Example 1 of U.S. Pat. No. 6,174,937, the disclosure of which is totally incorporated herein by reference; to 43.54 g of MEK-ST Organosilicasol™, obtained from Nissan Chemicals Industry, about 13.06 grams of dry nanoparticles, diluted with additional methyl ethyl ketone (MEK) solvent to maintain a free flowing solution during the addition of the ink components (a) to (f); (2) stirring the silica dispersion obtained in (1) for an additional 2 hours; (3) increasing the temperature to about 80 degrees C., the MEK solvent being slowly evaporated until a viscous solution is obtained; (4) the temperature of the viscous solution is further increased to about 135 degrees C. to facilitate the dissolution/melting of the ink components; (5) the temperature is maintained at 135 degrees C. until a clear and homogeneous solution is obtained and all the MEK is removed from the ink; (6) 40.12 grams of polyethylene wax (PE 500, obtained from Baker Petrolite, Tulsa, Okla., a polyethylene homopolymer with an average chain length of C-36) was slowly added to the hot dispersion, and the dispersion stirred for an additional 2 hours at about 500 rpm; (7) 2.60 grams (4.35 wt %) of the cyan colorant disclosed in Example VIII of U.S. Pat. No. 6,472,523, the disclosure of which is totally incorporated herein by reference, was added, the ink was stirred for about 2 additional hours at 135 degrees C. and then cooled to room temperature. The cyan ink thus prepared exhibited a viscosity of about 11.45 centipoise as measured by a Rheometric Instrument RFS III parallel-plate viscometer at about 120° C.

Inks 3 to 5 were prepared as described above except that the relative amounts of the different components were as shown in Table 1. The cyan inks thus prepared exhibited viscosities of about 12.44, 13.34 and 10.82 centipoise for Inks 3, 4 and 5 respectively, as measured by a Rheometric Instrument RFS III parallel-plate viscometer at about 120° C.

EXAMPLE 3

Table 2 shows two low energy phase change inks which were formulated with nanoparticles and with and without N,N distearylurea, a crystalline gelling agent capable of forming a network structure within a solid ink. The inks were prepared as described for Ink 2 of Table 1 with the Polywax 500 and Cyan Dye being respectively the next to last and last component being added. The urethane resin A and B are added instead of the tetra-amide resin.

TABLE 2

Low Energy Phase Change Inks Containing Nanoparticles

|  | Ink 6 | Ink 7 |
| --- | --- | --- |
| Silica (MEK ST) | 3.0788 | 3.0199 |
| Polywax 500 | 6.6217 | 6.6227 |
| Unilin 425 | 4.2500 | 4.2496 |
| N,N'-distearylurea | 1.4630 | 0 |
| Urethane Resin B | 0.8118 | 0.8164 |
| Urethane Resin A | 0.8088 | 0.8095 |
| Uniclear 100 | 0.5384 | 1.5060 |
| Cyan Dye | 0.5154 | 0.5034 |
| Naugard 445 | 0.0412 | 0.0430 |
| TOTAL (grams) | 18.129 | 17.571 |

Urethane Resin A described in U.S. Pat. No. 6,858,070 column 12, line 37-39, the disclosure of which is totally incorporated herein by reference.

Urethane B described in U.S. Pat. No. 6,858,070 column 12, line 48-50, the disclosure of which is totally incorporated herein by reference.

Cyan Dye synthesized as described in U.S. Pat. No. 6,472,523, Ex. VIII, the disclosure of which is totally incorporated herein by reference.

With reference to Table 2, these inks contained non-aggregated nanoparticles in the presence of a semi-crystalline or crystalline gelling agent, such as ester terminated polyamide gellant, Uniclear 100, or a urea gelling agent, such as N,N'-distearylurea, respectively, or mixtures thereof. In this case, the silica particles clearly aligned around the gel network. Electron micrographs were obtained for inks containing colloidal dispersion of nanoparticles. The electron micrographs provided silica particles which were 10-20 nm in size, and no larger size particles were seen in the inks. The subject inks also produced either substantially reduced or no aggregation of the silica particles. The inks were also filtered through 0.45 micron after aging at 130° C. for about 4 hours, showing good thermal stability. The above inks had a morphology associated with the use of nanoparticles in that they were self-aligned with no aggregation in the ink matrix. The alignment of the particles was along the gel network formed upon cooling. This alignment phenomenon was observed in inks containing distearylurea gelling agent in addition to a Uniclear 100 gellant. This morphology is distinctive and differentiates the subject ink from phase change inks which per se include silica, such as inks produced by other formation techniques.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A phase change ink carrier comprising (A) a colloidal dispersion of at least one of silica nanoparticles and metal oxide nanoparticles exhibiting a substantially uniform distribution of said nanoparticles discretely distributed therewithin and (B) at least one low melting wax and/or (C) a gelling agent, said phase change ink carrier being resistant to substantial aggregation of said nanoparticles distributed therewithin.

2. A phase change ink comprising a colorant and the phase change ink carrier according to claim 1.

3. An ink carrier according to claim 1, wherein said low melting wax is a polyalkylene wax and/or a functional wax.

4. An ink carrier according to claim 1, wherein said gelling agent comprises a crystalline and semi-crystalline gelling agent.

5. An ink carrier according to claim 4, wherein said gelling agent comprises an ester-terminated amide and/or a urea material.

6. An ink carrier according to claim 1, wherein the gelling agent comprises a dialkyl urea material having the following structural formula:

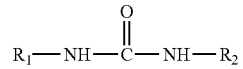

wherein $R_1$ and $R_2$ each, independently of the other, are alkyl groups comprising at least 10 carbon atoms.

7. An ink carrier according to claim 1, wherein the gelling agent comprises a dialkyl urea material.

8. An ink carrier according to claim 1, wherein the colloidal dispersion of nanoparticles is present in the ink carrier in an amount equal to or less than about 40% by weight.

9. An ink carrier according to claim 1, wherein the low melting wax is present in the ink carrier in an amount of from about 25% equal to or less than about 65% by weight.

10. An ink carrier according to claim 1, wherein the gelling agent is present in the ink carrier in an amount equal to or less than about 30% by weight.

11. An ink carrier according to claim 1, wherein nanoparticles act as a nucleus for the crystallization of the ink carrier, said nanoparticles aligning along the ink carrier formed by said crystallization.

12. An ink carrier according to claim 1, wherein the surface properties of at least a portion of the nanoparticles are chemically modified so as to produce ink particle composites that have gel-like properties.

13. An ink carrier according to claim 1, wherein the surface properties of at least a portion of the nanoparticles are chemically modified so as to produce UV curable functionalized nanoparticles.

14. A method for producing a phase change ink carrier comprising forming (A) a colloidal dispersion of at least one of silica nanoparticles and metal oxide nanoparticles and (B) a gelling agent, and forming an ink carrier comprising said colloidal dispersion of nanoparticles, the ink carrier exhibiting a substantially uniform distribution of said nanoparticles discretely distributed therewithin, and having a substantially increased resistance to aggregation of said nanoparticles distributed therewithin.

15. A method according to claim 14, wherein said ink carrier (1) is combined with (2) a colorant to form a phase change ink.

16. A method according to claim 14, wherein said ink carrier further includes (C) a low melting wax.

17. A method according to claim 14, wherein said gelling agent comprises a crystalline and semi-crystalline gelling agent.

18. A method according to claim 14, wherein said gelling agent comprises an ester-terminated amide and/or a urea material.

19. A method according to claim 14, wherein the gelling agent comprises a dialkyl urea material.

20. A method according to claim 14, wherein nanoparticles act as a nucleus for the crystallization of the ink carrier, said nanoparticles aligning along the ink carrier formed by said crystallization.

21. An method according to claim 14, which further includes chemically modifying the surface properties of at least a portion of the nanoparticles so as to produce ink particle composites that have gel-like properties.

22. A method which comprises (a) incorporating into an ink jet printing apparatus a low energy phase change ink composition comprising (1) an ink carrier comprising (A) a colloidal dispersion of at least one of silica nanoparticles and metal oxide nanoparticles, the ink carrier exhibiting a substantially uniform distribution of said nanoparticles discretely distributed therewithin, and having a substantial resistance to aggregation of said nanoparticles distributed therewithin; and (2) a colorant; (b) melting the low energy phase change ink composition; and (c) causing droplets of the melted ink to be ejected in an imagewise pattern onto a substrate.

23. A method according to claim 22, wherein the substrate is a final recording sheet and droplets of the melted ink are ejected in an imagewise pattern directly onto the final recording sheet.

24. A method according to claim 22, wherein the substrate is an intermediate transfer member and droplets of the melted ink are ejected in an imagewise pattern onto the intermediate transfer member followed by transfer of the imagewise pattern from the intermediate transfer member to a final recording sheet.

25. A method according to claim 24, wherein the intermediate transfer member is heated to a temperature above that of the final recording sheet and below that of the melted ink in the printing apparatus.

26. The method according to claim 22, which further includes chemically modifying the surface properties of at least a portion of the nanoparticles so as to produce ink particle composites that have gel-like properties.

27. A method for producing a low energy phase change ink composition comprising combining together (1) a ink carrier comprising (A) a colloidal dispersion of silica nanoparticles and metal oxide nanoparticles comprising said nanoparticles in a solvent, (B) a low melting wax, and (C) a gelling agent, the ink carrier exhibiting a substantially uniform distribution of said nanoparticles discretely distributed therewithin, and having a substantial resistance to aggregation of said nanoparticles distributed therewithin; and (2) a colorant.

28. A method according to claim 27, which further comprises combining said low melting wax and said gelling agent with said nanoparticles in a solvent, while evaporating said solvent, to form a substantially homogeneous solution of said ink carrier, and adding said colorant to said substantially homogeneous solution of said ink carrier to form said low energy phase change ink composition.

* * * * *